(12) United States Patent
Souther et al.

(10) Patent No.: US 7,253,584 B2
(45) Date of Patent: Aug. 7, 2007

(54) ISOLATED HIGH VOLTAGE BATTERY CHARGER AND INTEGRATED BATTERY PACK

(75) Inventors: James P. Souther, Los Angeles, CA (US); Eugene M. Steele, Cypress, CA (US); Karl D. Conroy, Huntington Beach, CA (US); Raymond G. Radys, Santa Monica, CA (US); Christopher P. Henze, Lakeville, MN (US)

(73) Assignee: General Motors Corporation, Detroit, MI (US)

( * ) Notice: Subject to any disclaimer, the term of this patent is extended or adjusted under 35 U.S.C. 154(b) by 334 days.

(21) Appl. No.: 10/637,815

(22) Filed: Aug. 8, 2003
(Under 37 CFR 1.47)

(65) Prior Publication Data
US 2004/0130288 A1     Jul. 8, 2004

Related U.S. Application Data

(60) Provisional application No. 60/410,521, filed on Sep. 12, 2002.

(51) Int. Cl.
*H02J 7/00* (2006.01)
(52) U.S. Cl. .................. 320/104; 320/119; 320/139; 320/162
(58) Field of Classification Search ........... 320/104, 320/119, 139, 162; 307/9.1, 10.6; 322/28
See application file for complete search history.

(56) References Cited

U.S. PATENT DOCUMENTS

| | | | |
|---|---|---|---|
| 5,719,488 A * | 2/1998 | Mashino et al. ........... 322/28 |
| 6,184,659 B1 * | 2/2001 | Darmawaskita ........... 320/139 |
| 6,262,561 B1 * | 7/2001 | Takahashi et al. ........... 320/104 |
| 6,456,044 B1 * | 9/2002 | Darmawaskita ........... 320/139 |
| 6,867,568 B1 * | 3/2005 | Olson et al. ........... 320/162 |
| 6,882,129 B2 * | 4/2005 | Boskovitch et al. ........ 320/119 |
| 6,888,266 B2 * | 5/2005 | Burke et al. ........... 307/10.6 |

* cited by examiner

*Primary Examiner*—Karl Easthom
*Assistant Examiner*—Samuel Berhanu

(57) ABSTRACT

Methods and apparatus are provided for charging a high-voltage battery of a hybrid electric vehicle. The high-voltage battery charging apparatus comprises a battery charger configured to provide electrical energy, a battery module configured to store the electrical energy provided by the battery charger, and a high-voltage bus coupled to the battery charger and the battery module, which is configured to transmit the electrical energy from the battery charger and battery module to the electrical system of the hybrid electric vehicle. In addition, the high-voltage battery charging apparatus comprises a bus contactor interposed between the high-voltage bus and the battery charger, which is bus contactor configured to provide a first substantial electrical isolation between the battery charger and the high-voltage bus during a charging period of the battery module. Furthermore, the high-voltage battery charging apparatus comprises an isolation mechanism interposed between the battery charger and the high-voltage bus and also interposed between battery charger and the battery module, which is configured to provide a second substantial electrical isolation between the battery charger, the battery module, and the high voltage bus during a non-charging period of the battery module.

26 Claims, 4 Drawing Sheets

FIG. 1 —PRIOR ART—

ISOLATED HIGH VOLTAGE BATTERY CHARGER AND INTEGRATED BATTERY PACK

CROSS-REFERENCES TO RELATED APPLICATION

This application claims the benefit of U.S. Provisional Application No. 60/410,521, filed Sep. 12, 2002.

TECHNICAL FIELD

The present invention relates generally to battery systems and more particularly to battery charging systems in hybrid electric vehicles.

BACKGROUND

Certain new types of vehicles, known as hybrid vehicles, employ a combustion engine coupled with a combination electric motor-generator to provide energy for vehicle locomotion. In some of these hybrid or mild-hybrid powertrain systems, an electric motor-generator system replaces the conventional starter motor and alternator. When the hybrid vehicle is decelerating or is stopped, the fuel flow to the engine is shut off to improve fuel economy. In contrast to a convention internal combustions engine, while the hybrid vehicle is at a standstill, the engine is not turning. The motor-generator system of the hybrid vehicle is implemented to enable this fuel cutoff feature while minimally affecting drivability.

In a mild-hybrid powertrain with an automatic transmission, when the brake pedal is released after a stop, the motor-generator system spins up the engine, and creeps the vehicle forward, similar to a conventional vehicle with an automatic transmission. The engine combustion can be commenced after some pre-determined period of time, or when the accelerator pedal is depressed. When the driver accelerates, the combustion engine restarts automatically and the hybrid vehicle can be driven in a conventional manner. When the combustion engine is running, the motor-generator acts as a generator to supply the hybrid electric vehicle's electrical power requirements, as well as recharging the on-board battery system. The vehicle's on-board battery system and a DCDC converter support the hybrid vehicle's electrical loads (fans, radio, etc) whenever the combustion engine is off.

While this new hybrid automotive design is advantageous from a fuel economy perspective, it can also present a need for additional design considerations. For example, it is necessary to periodically recharge the on-board battery pack in order for the hybrid vehicle to continue operating. There are presently at least three systems for charging the on-board battery pack of a hybrid vehicle. These three systems can be broadly characterized as follows: isolated charging systems; non-isolated charging systems; and integral charging systems.

The isolated charging systems employ a charger that incorporates a resonant converter type of power supply that allows electrical energy to be transformer-isolated from the vehicle battery during the charging cycle. Typical non-isolated charging systems do not generally employ the resonant converter topology for recharging the batteries. Finally, the typical integral charging system utilizes the motor windings and power electronics circuitry employed on the motor drive circuits to perform the battery-charging task. This approach typically includes the adoption of additional procedures in order to reduce the likelihood of delivering electrical power from the charging system to unintended locations.

While each of the previously mentioned charging systems has been adopted with some success, it should be noted that each of these systems also has certain limitations in the standard configuration. For example, in most typical conductive charging systems, a single contactor isolates the battery from the vehicle high-voltage system. This contactor is energized by the hybrid vehicle, both during vehicle propulsion and when the hybrid vehicle is receiving charging current from the off-board electric vehicle service equipment (EVSE). Since control of the electrical energy distribution during the charging sequence is considered desirable, these charging systems typically employ an isolation transformer to reduce the likelihood of inadvertent energy transfer.

During the typical charging sequence, other high-voltage loads usually serviced by the hybrid vehicle battery, such as air-conditioning, lighting and carious entertainment functions, can be brought on-line or taken off-line either automatically by the control system of the hybrid vehicle or by the vehicle operator. Additionally, the rating of the contactor is typically rated so as to be sufficient to handle the full battery current in the event of an anomaly involving either the charging system components or a high-voltage bus.

Yet another area of consideration with many battery-charging systems currently used in hybrid vehicles is the battery pack used to store the electrical power for the vehicle. Typically, the multiple inter-connections between the various components employ relatively expensive high-voltage cabling and connectors between the battery charger and the battery pack. The use of multiple, discrete components in the standard implementation generally means that control and signal cabling will be routed throughout the vehicle, possibly complicating the vehicle's electrical harness design and potentially increasing the cost of component integration and service.

Additionally, the pre-integration testing of the battery pack and associated control modules may become relatively complicated due to the typical industry practice of duplicating vehicle control functions in the manufacturing test environment. Further, the costs associated with integrating the modules into the electric vehicle and then performing various system-level test functions may be increased if the battery pack or the control modules fail the system level tests.

Finally, there are a continually developing set of requirements for battery charging systems driven not only by the practical considerations of the technology, but by various political situations. This includes various federal and state standards for battery charging systems that should also be considered in the design and implementation of new battery-charging systems. One example is the recent decision by the state of California Air Resource Board (CARB) to adopt a "zero-emissions" credit only for vehicles that utilize a conductive charging system in compliance with the Society of Automotive Engineers (SAE) standard known as SAE J1772. This decision contemplates the future ability of hybrid electric vehicles to actually provide surplus generated power from the vehicle to the larger local or even regional power grid in times of high utilization or emergency.

In view of the foregoing, it should be appreciated that it would be desirable to provide improved equipment and methods for charging the on-board battery module of a hybrid vehicle without adding significantly to the cost of the system. It is also desirable to more effectively control the energy distribution while charging the battery module. Additionally, compliance with various government standards is a desirable goal in order to maintain compatibility and enhance acceptance of new product designs. Furthermore, additional desirable features will become apparent to one skilled in the art from the foregoing background of the invention and following detailed description of a preferred exemplary embodiment and appended claims

BRIEF SUMMARY OF THE INVENTION

In accordance with the teachings of the present invention, a high-voltage battery charging apparatus and methods are provided for a hybrid electric vehicle having an electrical system. The high-voltage battery charging apparatus comprises a battery charger configured to provide electrical energy, a battery module configured to store the electrical energy provided by the battery charger, and a high-voltage bus coupled to the battery charger and the battery module, which is configured to transmit the electrical energy from the battery charger and battery module to the electrical system of the hybrid electric vehicle. In addition, the high-voltage battery charging apparatus comprises a bus contactor interposed between the high-voltage bus and the battery charger, which is bus contactor configured to provide a first substantial electrical isolation between the battery charger and the high-voltage bus during a charging period of the battery module. Furthermore, the high-voltage battery charging apparatus comprises an isolation mechanism interposed between the battery charger and the high-voltage bus and also interposed between battery charger and the battery module, which is configured to provide a second substantial electrical isolation between the battery charger, the battery module, and the high voltage bus during a non-charging period of the battery module.

BRIEF DESCRIPTION OF THE DRAWINGS

The preferred exemplary embodiments of the present invention will hereinafter be described in conjunction with the appended drawings, where like designations denote like elements, and.

DETAILED DESCRIPTION OF THE DRAWINGS

Figure 1:
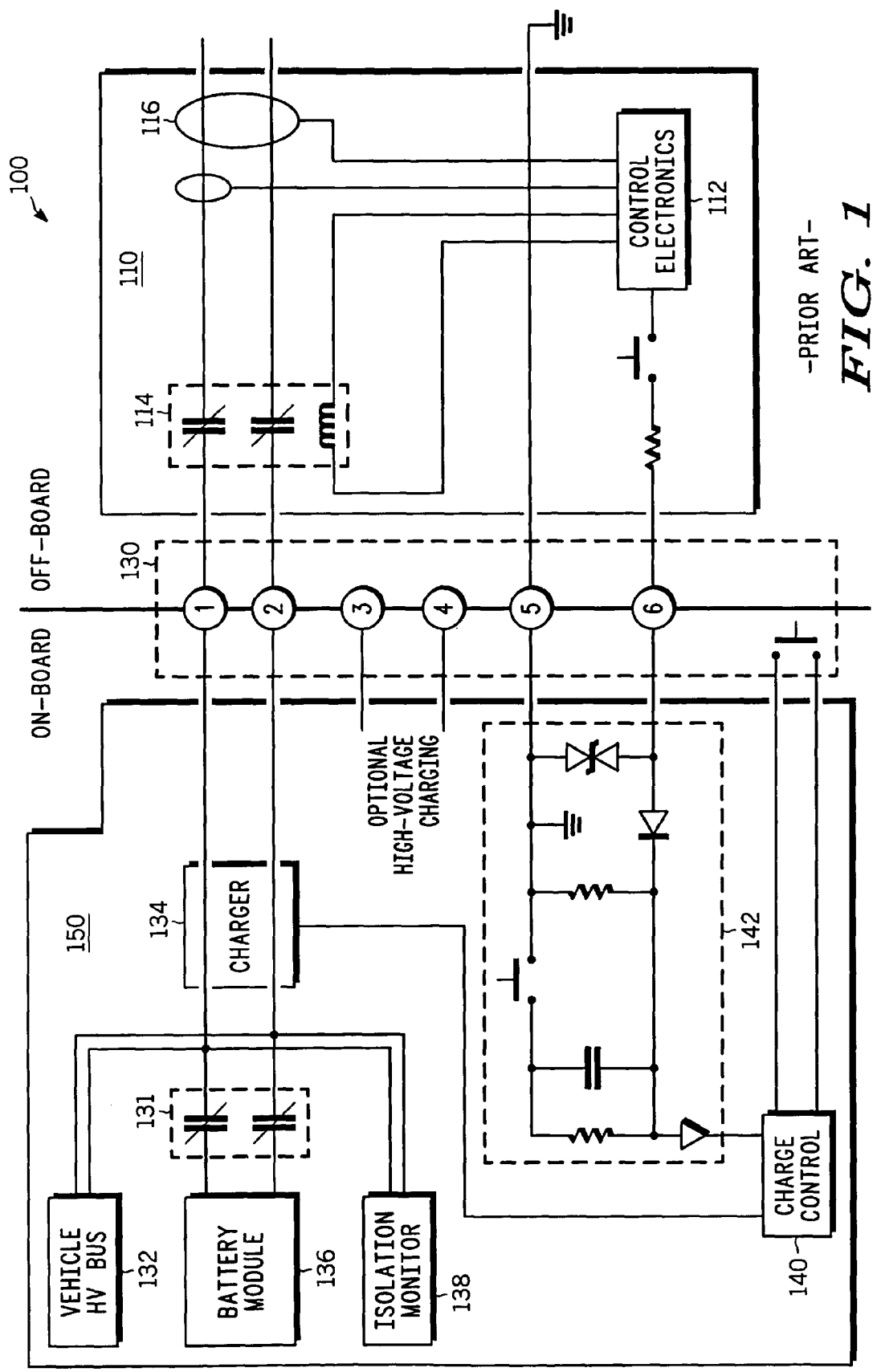
FIG. 1 is a schematic representation of a high-voltage battery charging apparatus for a hybrid electric vehicle in accordance with the prior art.

Referring now to FIG. 1, a high-voltage battery charging apparatus 100 is illustrated for a hybrid electric vehicle (not shown) having an electrical system (not shown) in accordance with the prior art. The high-voltage battery charging apparatus 100 comprises a high-voltage charging system 150 on the hybrid electrical vehicle (i.e., on-board), a conductive coupling component 130, and Electric Vehicle Service Equipment (EVSE) 110 off the hybrid electrical vehicle (i.e., off-board). For purposes for the discussion presented herein, "high-voltage" shall mean voltages in excess of approximately one-hundred fifty volts (150 v), and more preferably include voltages in excess of approximately three hundred fifty volts (350 v).

EVSE 110 is configured as the off-board power source for re-charging the battery module on-board the hybrid electric vehicle. EVSE 110 preferably comprises a voltage imbalance sense line 116, an electro-mechanical contactor 114, a control electronics module 112, and a power source terminated with an electrical connector suited for connection to hybrid electric vehicles, such as a typical SAE J1772 connector. However, any number of EVSE configurations can be utilized in accordance with the present invention.

Imbalance sense line 116 of EVSE 110 is preferably configured to significantly inhibit and preferably halt the power flow from EVSE 110 to on-board high-voltage charging system 150 if an electrical anomaly is detected in high-voltage battery charging apparatus 100, and control electronics module 112 is preferably configured to control the overall operation of EVSE 110. For example, control electronics module 112 determines whether EVSE 110 is properly connected to conductive coupling component 130. In addition, control electronics module 112 indicates that EVSE 110 is ready to supply power to the attached hybrid electric vehicle and will provide a substantial electrical connection by closing contactor 114 after sensing that the operational conditions of EVSE 110 are operating within the appropriate limits. Furthermore, control electronics module 112 also communicates the nominal current rating for EVSE 110 to the attached hybrid electric vehicle.

Contactor 114 of EVSE 110 is preferably a high-voltage AC contactor that enables the utility service voltage to reach conductive coupling component 130. Contactor 114 is typically controlled by control electronics module 112 and is closed to provide a substantial electrical connection between the EVSE 110 and the conductive coupling component 130, which permits power flow when the appropriate current conditions are sensed by EVSE 110. As can be appreciated by one of ordinary skill in the art, numerous contactors types and configurations can be used in accordance with the present invention.

Conductive coupling component 130, which is coupled to the contactor 114 is preferably a multi-pin connector attached to EVSE 110, and provides the physical connection mechanism for EVSE 110 to supply energy to battery module 136, via high-voltage charging system 150 as subsequently described in this detailed description of the drawings. The conductive coupling component 130 typically includes a series of pin connectors (e.g., pins 1-6 as shown in FIG. 1), which are used for various purposes associated with charging the hybrid electric vehicle. For example, pins 1 and 2 can be used to provide an AC power signal from EVSE 110 to the hybrid electric vehicle, pins 3 and 4 can be used to provide a high-voltage direct current (DC) charge to the hybrid electric vehicle, and pins 5 and 6 can be used as connectors for control and status-sensing circuitry. However, any number of pins in other configurations can be used in accordance with the present invention.

The high-voltage charging system 150, which is coupled to the conductive coupling component 130 comprises a contactor 131, a battery charger 134 that is configured to provide electrical energy, a battery module 136 that is configured to store the electrical energy provided by the battery charger 134, and a vehicle high-voltage bus 132 that is configured to transmit the electrical energy from the battery charger 134 and the battery module 136 to the electrical system of the hybrid electrical vehicle.

The contactor 131 of the typical high-voltage charging system 150 is interposed between the battery module 136 and battery charger 134. Due to the location of contactor 131, the contactor 131 is configured to provide a substantial electrical connection between the battery charger 134 and the battery module 136 during normal propulsion of the hybrid vehicle and also when the hybrid vehicle is receiving charging current from EVSE 110 through the battery charger 134 (i.e., during the charging period of the battery module 136). During these charging periods, other high-voltage loads serviced by battery module 136, such as the heating/air conditioning systems, can be brought on-line or taken under operator or vehicle control. Additionally, contactor 131 is typically rated to handle the full amount of current supplied by battery module 136 in the event of improper operation of the charging components associated with vehicle high-voltage bus 132 or the battery charger 134. Accordingly, contactor 131 is usually a relatively heavy-duty component and is typically rated for at least approximately four hundred amperes (400 A), and generally rated for greater than approximately four hundred amperes (400 A).

As previously stated in this detailed description of the drawings, vehicle high-voltage bus 132 serves to transmit the electrical energy to the various electrical systems that is stored in battery module 136 and battery charger 134. The electrical systems of the hybrid electric vehicle that received electrical energy from the battery module 136 via the vehicle high-voltage bus 132 can include numerous systems of the hybrid electric vehicle. For example, the electrical systems can include both the propulsion system and the auxiliary components (e.g., lighting systems, electronic accessories, convenience outlets, etc.). It should be noted that while battery module 136, which provides the electrical energy to the electrical systems, is depicted as a single unit, battery module 136 may be implemented as a single battery or, most preferably, as a bank of interconnected re-chargeable batteries. The batteries that comprise battery module 136 may be lead-acid, nickel-metal-hydride, lithium, or any other type of battery suitable for use in a hybrid vehicle.

In addition to the foregoing elements of the high-voltage charging system 150, the high-voltage charging system 150 comprises isolation monitor 138. Isolation monitor 138 is configured to monitor high-voltage bus 132 for possible undesirable and inadvertent electrical connections. For example, the isolation monitor can be configured to monitor high-voltage bus 132 for undesirable chassis connections. If such a connection is detected, isolation monitor 138 will disconnect (i.e., electrically isolate) vehicle high-voltage bus 132 from the other components of the high-voltage charging system 150 (e.g., battery module 136 and battery charger 134).

In addition to the isolation monitor 138, the high-voltage charging system 150 preferably comprises charge control module 140 and discrete analog components 142. The charge control module 140 regulates the power flow from battery charger 134 to vehicle high-voltage bus 132 in response to the battery state-of-charge and the power requirements of the various electrical systems supplied by vehicle high-voltage bus 132, and discrete analog components 142, as connected to charge control module 140, represent passive control circuitry used by EVSE 110 to verify a positive connection to the hybrid electric vehicle. In addition, the discrete analog components preferably provide a status indication of the readiness of the hybrid electric vehicle to accept energy from EVSE 110. Additional details regarding discrete analog components 142 can be found in SAE J1772, which is hereby incorporated by reference.

Figure 2:
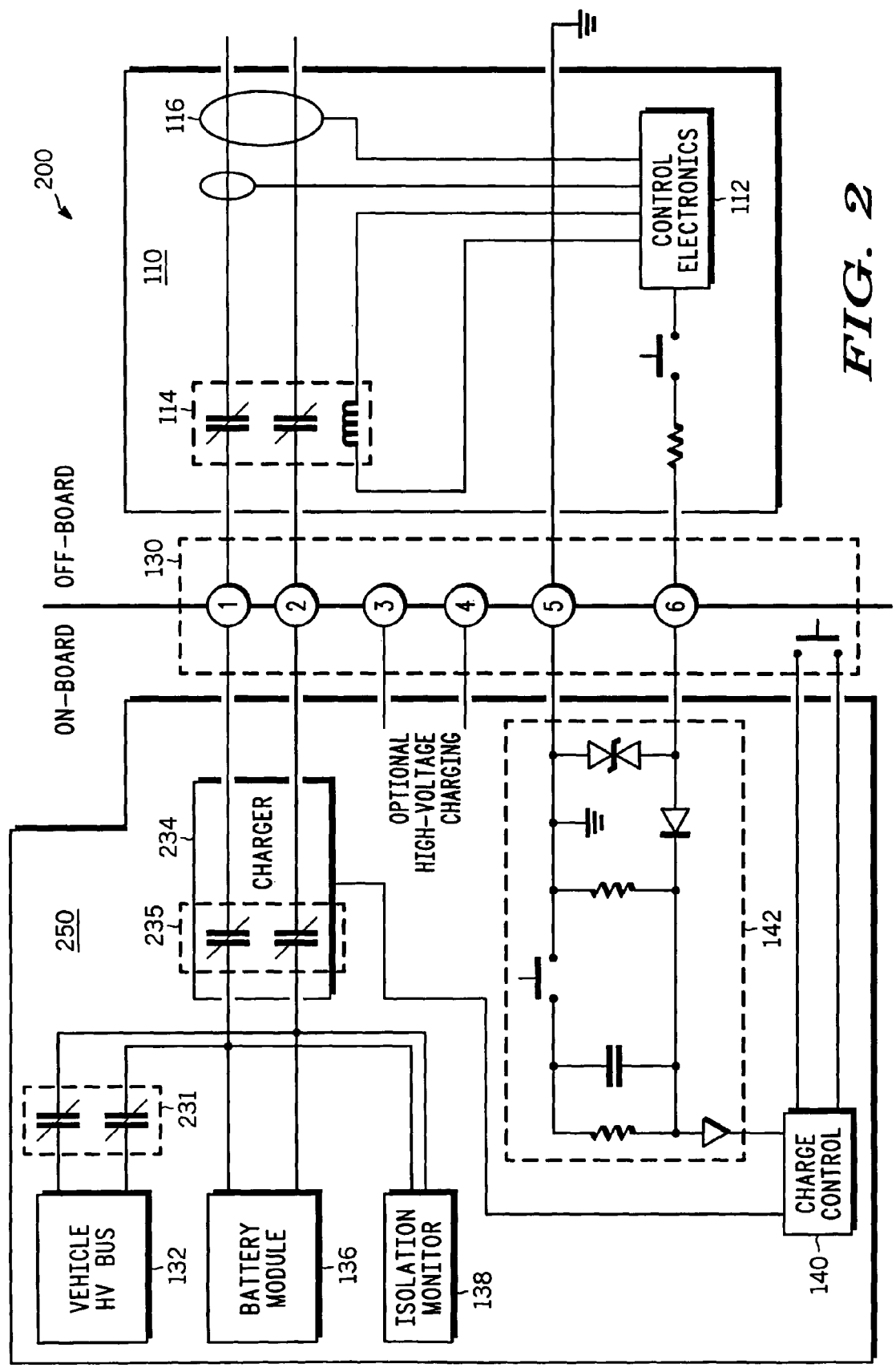
FIG. 2 is a schematic representation of a high-voltage battery charging apparatus for a hybrid electric vehicle in accordance with a preferred embodiment of the present invention.

Referring now to FIG. 2, a high-voltage battery-charging apparatus 200 for a hybrid electric vehicle is illustrated in accordance with a preferred exemplary embodiment of the present invention. The high-voltage battery-charging apparatus 200 of the present invention comprises some of the same components as the high-voltage battery charging apparatus 100 of the prior art, with several notable exceptions. For example, in the case of the high-voltage battery charging system 200 of the present invention, high-voltage charging system 250 incorporates an isolation mechanism 235, which is preferably, but not necessarily, an integral component of the battery charger 234, that is interposed between the battery charger 234 and the high-voltage bus 132, and also interposed between the battery charger 234 and the battery module 136. Additionally, contactor 131 as shown and described with reference to FIG. 1 has been repositioned and replaced by a bus contactor 231. More specifically, the bus contactor 231 has been interposed between the high-voltage bus 132 and the battery charger 234. More preferably, the bus contactor 231 is interposed between the isolation mechanism 235 and the high-voltage bus 132. The location of the bus contactor and the introduction of isolation mechanism 235 allows for numerous advantages. For example, the bus contactor may be rated for less current than primary contactor 131. It should be once again noted that while isolation mechanism 235 is most preferably integrated into battery charger 234, in some embodiments of the present invention, isolation mechanism 235 may be a separate, discrete component in accordance with the present invention.

Isolation mechanism 235 may be implemented with any number apparatuses or techniques, such as a standard electro-mechanical contactor or as a solid-state switch (e.g., a high-voltage rated semi-conductor device). This approach differs from the commonly implemented practice of using an isolation transformer in the charging circuit for isolation of the charging system from the hybrid electric vehicle during the charging period. Accordingly, by positioning bus contactor 231 between battery charger 234 and vehicle high-voltage bus 132, introducing isolation mechanism 235 between the battery charger 234 and the high-voltage bus 132, and introducing isolation mechanism 235 between the battery charger 234 and the battery module 136, the standard use of an isolation transformer can be obviated.

Since most presently used isolation transformers are often bulky, heavy and relatively expensive, removing the isolation transformer from the circuit will typically serve to reduce both weight and cost. By selectively configuring isolation mechanism 235 and bus contactor 231 to provide substantial electrical isolations and substantial electrical connections, vehicle high voltage bus 132 may be connected or disconnected to the loads associated with the hybrid vehicle. Similarly, high-voltage charging system 250 may be isolated from EVSE 110 by configuring isolation mechanism 235 to provide the substantial electrical isolation (e.g., open circuit). During a charging period of the battery module 136, bus contactor 231 is configured to provide a substantial electrical isolation of the vehicle high-voltage bus and only isolation mechanism 235 is preferably configured to provide a substantial electrical connection between the battery charge 234 and the battery module 136. This configuration allows battery module 136 to be charged during the charging period while the vehicle high-voltage bus 132 is electrical isolated from the battery charger 234 and the battery module 136.

This operational configuration as described in the previous paragraphs effectively disconnects the electrical loads of the hybrid electric vehicle from vehicle high-voltage bus 132 during the charging period. In a similar fashion, during normal vehicle operation, in which the battery module 136 is not charging (i.e., non-charging period of the battery module 136), the bus contactor 231 is configured to provide a substantial electrical connection between the battery module 136 and the vehicle high-voltage bus 132. In addition, during the non-charging period, isolation mechanism 235 is configured to provide a substantial electrical isolation between the battery charger 234, the battery module 136, and the vehicle high-voltage bus 132. Essentially, disconnecting charging system 250 from EVSE 110 allows vehicle high-voltage bus 132 to service the load of the hybrid electric vehicle. This isolation configuration is also applicable to non-isolated charging topologies as well. While both isolation mechanism 235 and bus contactor 231 may be configured to provide substantial electrical connections at the same time, in the most preferred embodiments of the present invention, only one of isolation mechanism 235 and bus contactor 231 may provide a substantial electrical connection at a given time.

Figure 3:
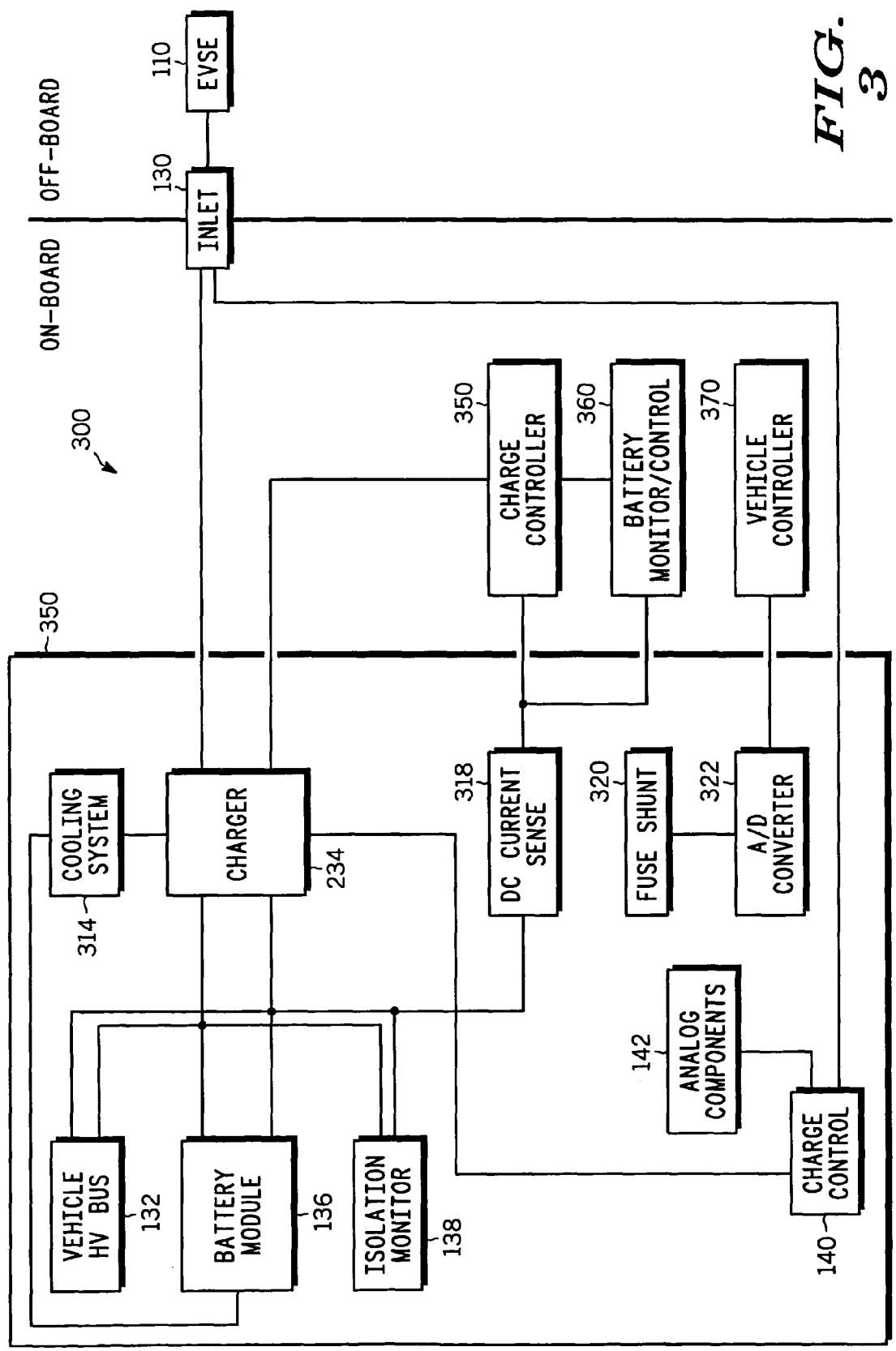
FIG. 3 is a schematic representation of a high-voltage battery charging apparatus for a hybrid electric vehicle with an Integrated Battery Pack (IBP) in accordance with a preferred exemplary embodiment of the present invention.

Referring now to FIG. 3, a high-voltage battery-charging apparatus 300 is illustrated with an integrated battery pack (IBP) 310 in accordance with a preferred exemplary embodiment of the present invention. The high-voltage battery-charging apparatus 300 comprises EVSE 390, which is configured to provide an off-board source of electrical energy; conductive coupling component 380, which is configured to transmit the electrical energy; and IPB 310, which is configured to receive the electrical energy from the conductive coupling component 380. The IPB 310 preferably comprises battery module 312, a high-voltage bus 132, a bus contactor 231, and isolation mechanism 235 as previously described in this detailed described with reference to FIG. 2. Furthermore, the IBP 310 preferably comprises at least a cooling system 314 integrally formed in the IPB 310.

Cooling system 314 preferably provides cooling for battery module 312. The cooling system 314 provides cooling of the battery module 312 to prevent undesirable accumulation of heat inside IBP 310, as excessive heat can result in undesirable consequences, such as reducing the useful period of the battery module 312 (i.e., battery life) and also introducing additional design considerations in certain circumstances. Cooling system 314 may be implemented using am air based, gas-based, and/or liquid-based coolant system, or some other cooling mechanism.

According to another embodiment of the present invention, the battery charger 316 is also integrally formed in the IPB 310. Integrating battery charger 316 into IBP 310 as shown in FIG. 3 allows for the use of self-contained cooling system 314 to provide cooling for both the power electronics associated with battery charger 316 and IBP 310. The use of cooling system 314 to cool both battery module 312 and battery charger 316 can increase the possible power density of battery charger 316, allowing for further reductions in the physical size of battery charger 316. For example, the standard 6 kW battery charger can then be packaged in the same approximate volume as an existing battery module that does not incorporate the features of the present invention. Additionally, the inclusion of battery charger 316 in IBP 310 significantly reduces and generally eliminates the additional high-voltage connector on the exterior of IBP 310 and may also reduce the amount of cabling required to connect battery charger 316 to battery module 312.

In accordance with an alternative embodiment of the present invention, a DC current sense module 318, a fuse shunt module 320, an analog-to-digital (A/D) converter 322, and a high-voltage output bus 340 are integrally formed in the IBP 310 as shown in FIG. 3. Analog-to-digital (A/D) converter 322 is connected to vehicle controller 370 and converts various analog signals to digital signals and communicates information from battery pack 310 to vehicle controller 370. DC current module 318 is provided to monitor the amount of current flowing into battery module 312, thereby providing information for adaptively adjusting the current flow to maintain appropriate current levels for effective and efficient charging operations. The Fuse shunt module 320 is a device for disabling the current flow within IBP 310 in case of component or system level anomaly, and Analog-to-digital (A/C) converter 322 provides a communication link between IBP 310 and vehicle controller 370. A/D converter 322 converts the analog signals from IBP 310 to digital signals for use by vehicle controller 370 and converts the digital signals received from vehicle controller 370 to analog signals for use by IBP 310.

Figure 4:
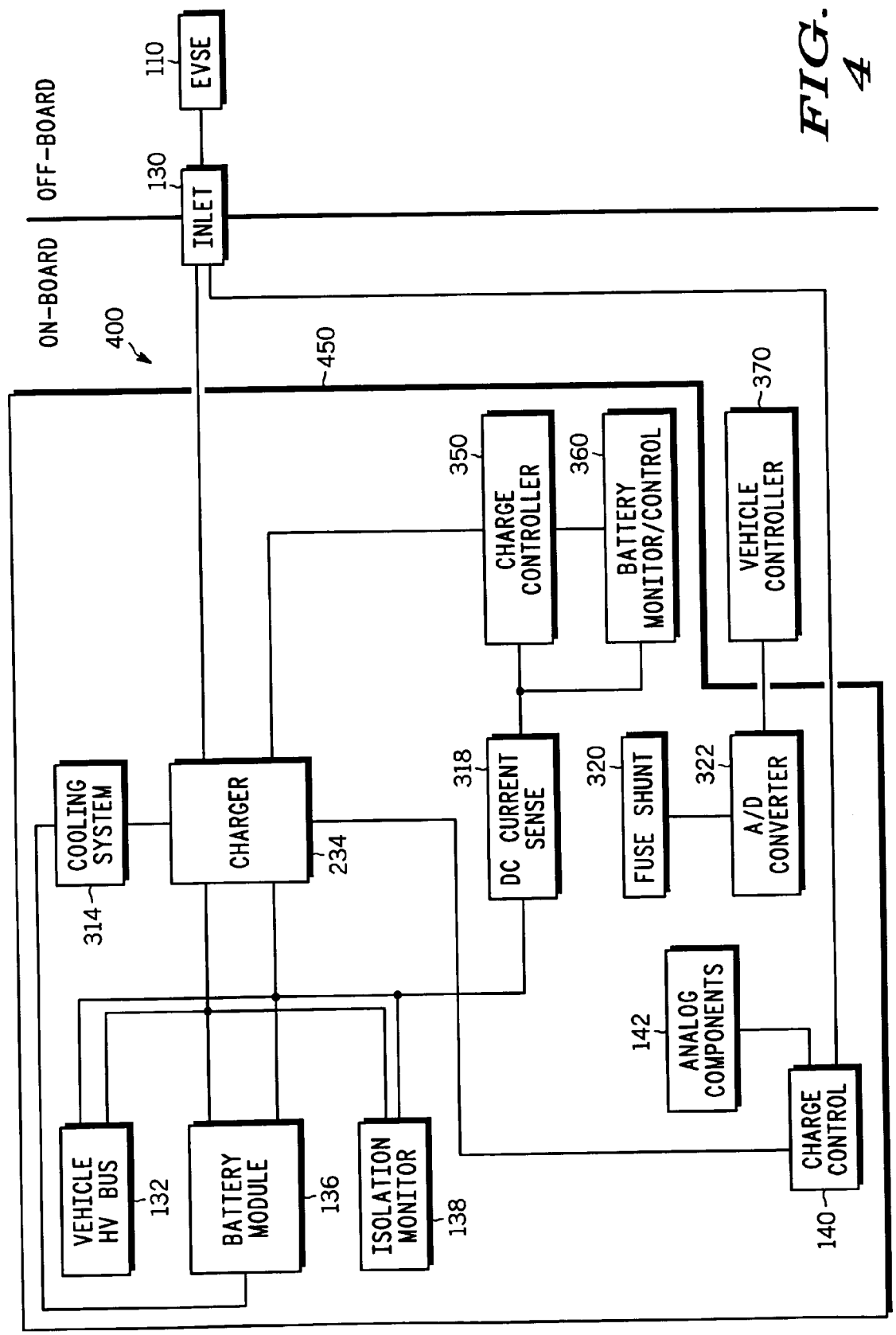
FIG. 4 is a schematic representation of a high-voltage battery charging apparatus for a hybrid electric vehicle with an Integrated Battery Pack (IBP) in accordance with an alternative preferred exemplary embodiment of the present invention.

In accordance with an alternative embodiment of the present invention, a DC current sense module 318 the charger controller 350 and battery monitor/control 360 are integrally formed in the IBP 310 as shown in FIG. 4. The additional level of integration offered with the integral formation of the charge controller 450 and battery monitor/control module 460 into the IBP 310 creates what is essentially a stand-alone battery pack. With a stand-alone battery pack, testing/support procedures for charging components and systems become less complicated and more robust. In this preferred embodiment of the present invention, the connections to IBP 410 are reduced to an AC input from EVSE 490 to inlet 480, the interface for vehicle controller 470, and the high-voltage interface for high-voltage output bus 440.

By adopting the most preferred embodiments of the present invention as shown in FIG. 4, IBP 410 is a self-contained unit that can be simply integrated into the hybrid vehicle and IBP 410 may be readily tested in an environment where the vehicle is not present. Furthermore, with a simulation of the on-board vehicle controller 470, providing AC input power from a standard wall outlet, and connecting a simulated DC load to high-voltage output bus 440, the various functions and overall operation of IBP 410 can be tested without the physical presence of a hybrid vehicle. This simplifies the testing environment and makes the trouble-shooting process for IBP 410 more robust and reliable.

From the foregoing description, it should be appreciated that the methods described herein provide for an improved battery charging system for hybrid vehicles. The battery charging procedure disclosed herein provides for enhanced operational performance, decreased costs, increased reliability, enhanced maintenance, and decreased volume for the battery charging system. In addition, monitoring of the battery-charging process is more effective. Finally, by utilizing the integrated battery pack of the present invention, the battery pack becomes a stand-alone component of the hybrid vehicle. The integration of the various components also tends to reduce the number and cost of the interconnections of the components.

While certain elements have been presented in the foregoing detailed description of the preferred exemplary embodiments, it should be appreciated that a vast number of variations in the embodiments exist. It should also be appreciated that the preferred exemplary embodiments are only examples, and are not intended to limit the scope, applicability, or configuration of the invention in any way. Rather, the foregoing detailed descriptions provide those skilled in the art with a convenient road map for implementing the preferred exemplary embodiments of the invention. It should also be understood that various changes may be made in the function and arrangement of elements described in the preferred exemplary embodiments without departing from the spirit and scope of the invention as set forth in the appended claims.

The invention claimed is:

1. A high-voltage battery charging apparatus for a hybrid electric vehicle having an electrical system, comprising:
   a battery charger configured to provide electrical energy;
   a battery module configured to store said electrical energy provided by said battery charger;
   a high-voltage bus coupled to said battery charger and said battery module, said high voltage bus configured to transmit said electrical energy from said battery charger and battery module to the electrical system of the hybrid electric vehicle;
   a bus contactor interposed between said high voltage bus and said battery charger, said bus contactor configured to provide a first substantial electrical isolation between said battery charger and said high-voltage bus and to thereby allow a charging period of said battery module during which said battery charger transmits electrical energy to said battery and not to said high-voltage bus; and
   an isolation mechanism interposed between said battery charger and said high-voltage bus and also interposed between said battery charger and said battery module, said isolation mechanism configured to provide a second substantial electrical isolation between said battery charger and said high-voltage bus, and also between said battery charger and said battery module during a non-charging period of said battery module.

2. The high-voltage battery-charging apparatus for the hybrid electric vehicle of claim 1, wherein said bus contactor is further configured to provide a substantial electrical connection between said battery module and said high-voltage bus during said non-charging period.

3. The high-voltage battery-charging apparatus for the hybrid electric vehicle of claim 1, wherein said isolation mechanism is further configured to provide a substantial electrical connection between said battery module and said battery charger during said charging period.

4. The high-voltage battery-charging apparatus far the hybrid electric vehicle of claim 1, wherein said isolation mechanism comprises an electra-mechanical contactor.

5. The high-voltage battery-charging apparatus for the hybrid electric vehicle of claim 1, wherein said isolation mechanism comprises a solid-state switch.

6. The high-voltage battery-charging apparatus for the hybrid electric vehicle of claim 1, wherein said battery module comprises a plurality of lead-acid batteries.

7. The high-voltage battery-charging apparatus for the hybrid electric vehicle of claim 1, wherein said battery module comprises a plurality of nickel-metal-hydride batteries.

8. The high-voltage battery-charging apparatus for the hybrid electric vehicle of claim 1, wherein said battery module comprises a plurality of lithium batteries.

9. The high-voltage battery-charging apparatus for the hybrid electric vehicle of claim 1, wherein said battery module further comprises:
   a conductive coupling component That is configured to couple a power source external to the hybrid electric vehicle with said battery charger for charging said battery module.

10. The high-voltage battery-charging apparatus for the hybrid electric vehicle of claim 9, wherein said power source external to the hybrid electric vehicle is Electric Vehicle Service Equipment (EVSE).

11. The high-voltage battery-charging apparatus for the hybrid electric vehicle of claim 1, further comprising a charge control module coupled to said battery charger, said charge control module being configured to selectively energize or de-energize said battery charger.

12. The high-voltage battery-charging apparatus for the hybrid electric vehicle of claim 1, further comprising an isolation monitor coupled to said bus contactor, to said battery module and to said isolation mechanism, said isolation monitor configured to control said isolation mechanism and said bus controller in order to provide a substantial isolation between said vehicle bus, said battery module, and said battery charger upon detection of an undesirable connection in the electrical system of the electric hybrid vehicle.

13. The high-voltage battery-charging apparatus for the hybrid electric vehicle of claim 1, wherein said isolation mechanism is an integrated component of said battery charger.

14. A high-voltage battery-charging apparatus for a hybrid electric vehicle having an electrical system, comprising:
   an Electric Vehicle Service Equipment (EVSE) configured to provide an off-vehicle source of electrical energy for charging an on-board battery of said hybrid electric vehicle;
   a conductive coupling component that is configured to couple said EVSE to said on-board battery of said electric vehicle;
   an on-board high-voltage charging system that is coupled to said conductive coupling component and configured to control said charging of said on-board battery during a charging period and a non-charging period, said on-board high-voltage charging system comprising:
      a battery charger that is coupled to said conductive coupling component and configured to receive said electrical energy from said EVSE;
      a high-voltage bus coupled to said battery charger and said on-board battery of the hybrid vehicle, said high voltage bus configured to transmit said electrical energy from said battery charger and also configured to transmit said electrical energy stored by said on-board battery;
      a bus contactor interposed between said high voltage bus and said battery charger, said bus contactor configured to provide a first substantial electrical isolation between said battery charger and said high-voltage bus and to thereby allow said charging period during which said battery charger transmits electrical energy to said battery and not to said high-voltage bus; and
      an isolation mechanism interposed between said battery charger and said bus contactor and interposed between said battery charger and said on-board battery, said isolation mechanism configured to provide a second substantial electrical isolation between said battery charger and said high-voltage bus, and also between said battery charger and said battery module during said non-charging period.

15. The high-voltage battery-charging apparatus for the hybrid electric vehicle having the electrical system of claim 14, wherein said bus contactor is further configured to provide a substantial electrical connection between said on-board battery and said high-voltage bus during said non-charging period.

16. The high-voltage battery-charging apparatus for the hybrid electric vehicle having the electrical system of claim 14, wherein said isolation mechanism is further configured to provide a substantial electrical connection between said on-board battery and said battery charger during said charging period.

17. The high-voltage battery-charging apparatus for the hybrid electric vehicle having the electrical system of claim 14, wherein said isolation mechanism comprises an electro-mechanical contactor.

18. The high-voltage battery-charging apparatus for the hybrid electric vehicle having the electrical system of claim 14, wherein said battery module comprises a plurality of lead-acid batteries.

19. The high-voltage battery-charging apparatus for the hybrid electric vehicle having the electrical system of claim 14, wherein said on-board high-voltage charging system further comprising a charge control module coupled to said battery charger, said charge control module being configured to selectively energize or de-energize said battery charger.

20. The high-voltage battery-charging apparatus for the hybrid electric vehicle having the electrical system of claim 14, said on-board high-voltage charging system further comprising an isolation monitor coupled to said bus contactor, to said on-board battery and to said isolation mechanism, said isolation monitor configured to provide a substantial electrical isolation of said high-voltage vehicle bus with said isolation mechanism and said bus contactor upon detection of an undesirable connection in electrical system of the electric hybrid vehicle.

21. A method for charging a high-voltage battery of a hybrid electric vehicle having an electrical system, comprising:
   providing electrical energy with a battery charger;
   storing said electrical energy in a battery module to said hybrid electric vehicle;
   transmitting said electrical energy with a high-voltage bus from said battery module and from said power source to said electrical system;
   activating an isolation mechanism interposed between said battery charger and said battery module to provide a first substantial electrical isolation between said battery charger and said high voltage bus during a non-charging period of the battery module; and
   activating a bus contactor interposed between said high voltage bus and said battery charger to provide a second substantial electrical isolation between said battery charger and said high-voltage bus and to thereby allow a charging period of said battery module during which said battery charger transmits electrical energy to said battery and not to said high-voltage bus.

22. The method of charging a battery module in a hybrid electric vehicle having the electrical system of claim 21, wherein said activating said bus contactor further provides a substantial electrical connection between said battery module and said high-voltage bus during said non-charging period of said battery module.

23. The method of charging a battery module in a hybrid electric vehicle having the electrical system of claim 21, wherein said activating said isolation mechanism further provides a substantial electrical connection between said battery module and battery charger during said charging period of said battery module.

24. The method of charging a battery module in a hybrid electric vehicle having the electrical system of claim 21, further comprising coupling a power source external to the hybrid electric vehicle with said battery charger.

25. The method of charging a battery module in a hybrid electric vehicle having the electrical system of claim 21, further comprising:
   detecting an undesirable connection in the electrical system of the electric hybrid vehicle; and
   activating said isolation mechanism and said bus controller in order to provide a substantial isolation between said vehicle bus, said battery module, and said battery charger.

26. An Integrated Battery Pack (IPB) for a hybrid electric vehicle having an electrical system, which is coupled to a conductive coupling component and configured to control charging of a battery module with an EVSE during a charging and a non-charging period; comprising:
   a battery charger integrally formed in the IPB and coupled to the conductive coupling component, said battery charger configured to receive electrical energy from the EVSE;
   a high-voltage bus integrally formed in the IPB and coupled to said battery charger and the battery module, said high voltage bus configured to transmit said electrical energy received from said EVSE and also configured to transmit said electrical energy stored by the battery module;
   a bus contactor integrally formed in the IPB and interposed between said high-voltage bus and said battery charger, said bus contactor configured to provide a first substantial electrical isolation between said battery charger and said high voltage bus during the charging period;
   an isolation mechanism integrally formed in the IPB and interposed between said battery charger and said bus contactor and interposed between battery charger and said on-board battery, said isolation mechanism configured to provide a second substantial electrical isolation between said battery charger, said battery module and said high voltage bus during said non-charging period; and
   a cooling system integrally formed in the IPB, said cooling system configured to cool said battery charger during said charging period.

* * * * *